Patented Jan. 10, 1939

2,143,478

UNITED STATES PATENT OFFICE 2,143,478

MANUFACTURE OF ALIPHATIC TERTIARY ALCOHOLS

William Engs and Alasdair W. Fairbairn, Oakland, Calif., assignors to Shell Development Company, San Francisco, Calif., a corporation of Delaware No Drawing. Application July 28, 1936, Serial No. 93,020

8 Claims. (Cl. 260—641)

This invention relates to the manufacture of aliphatic tertiary alcohols of five or more carbon atoms per molecule and deals particularly with an improved method of treating such alcohols whereby their stability may be greatly improved, especially during manufacture, and their purity increased.

Tertiary butyl alcohol is quite stable and causes little difficulty in manufacture as a result of decomposition during distillation provided the ordinary precautions are observed. However, as produced technically, tertiary amyl and higher tertiary alcohols are subject to decomposition with liberation of water when merely refluxed at normal pressure. This decomposition not only causes undesirable loss during manufacture but also makes it difficult to completely dehydrate the alcohol by distillation as small amounts of water and olefine are continually formed and contaminate the product.

We have found that the addition of a small amount of a suitable basic agent which is soluble in, and preferably less volatile than, the aliphatic tertiary alcohol or alcohols involved, completely eliminates these difficulties and renders the alcohol completely stable during and after manufacture.

Our invention may be applied to the stabilization of any aliphatic tertiary alcohol of five or more carbon atoms regardless of its source or method of manufacture. Typical of such alcohols are, for example, dimethyl ethyl carbinol, dimethyl propyl carbinol, dimethyl isopropyl carbinol, diethyl methyl carbinol, dimethyl vinyl carbinol, dimethyl allyl carbinol, tetramethylenedimethyl carbinol, methyl tertiary cyclopentanol and higher homologues, analogues and suitable substitution products.

Many organic bases are available for effecting the desired stabilization. Thus, for example, mono or poly aliphatic, aralkyl, carbocyclic or heterocyclic amines whether of primary, secondary or tertiary character may be used, e. g. butyramine, diethylcarboxylamine, normal or iso amyl amine, 1,3 dimethyl-3-aminobutane, di-n-propyl carboxylamine, methyl-n-butyl or normal or iso amyl amine, di-tertiary butyl amine, triethyl amine, di-ethyl-n-propyl amine, methyl-ethyl-n-butyl amine, aniline, naphthylamine, diphenylamine, ethyl aniline, dimethyl aniline, diethyl benzylamine, 2-amino pyridine, ethylene diamine, phenylene diamine, benzidine, 2:6 diamino pyridine, etc. Cyclic nitrogen bases such as pyrrole, indole, pyridine, quinoline, piperidine, pyrozole, naphtha quinoline, piperazine, morpholine, methyl morpholine, and the like may also be used. Particularly useful are the alkylolamines such as mono, di and/or tri ethanolamine, propanolamine, etc. The saturated or unsaturated homologues, analogues and substitution products (such as those containing halogen and the like for example) of the above and like organic nitrogen base compounds as well as the organic quaternary ammonium bases may be used. Instead of organic nitrogen bases other basic organic compounds which are soluble in aliphatic tertiary alcohol may be used, typical examples being basic salts of organic acids such as sodium acetate, and the like, or organic hydroxy compounds in which the hydrogen of the hydroxyl group has been replaced by a metal or an ammonium group, particularly alcoholates or phenolates as the alkali metal, or alkaline earth metal or aluminum, etc., methylates, ethylates, normal or iso-propylates, butylates, phenates, cresolates, naphtholates, and the like. Particularly useful are the alcoholates of the tertiary aliphatic alcohol being stabilized such for example as aluminum tertiary amylate as no undesirable impurity is thereby introduced. These organic bases may be used in the form of the pure chemical individuals or mixtures thereof, or as crude or semirefined products or heterogeneous mixtures of more or less uncertain composition, such, for example, as are obtainable as, or from, the acid extract of coal tar, petroleum oil, cracked distillates, and like nitrogen containing materials. These bases may be employed either alone or in admixture with other materials which may or may not themselves be basic acting.

The amount of organic base which will be required to effect the desired stabilization in any particular case will depend upon the aliphatic tertiary alcohol or alcohols involved and the organic base or basic mixture chosen. In general, only very small amounts are necessary, usually additions of as little as 0.001% by volume are effective, although up to about 0.5% by volume or more may sometimes be desirable. The organic base may be added to the finished product as normally produced, whereby its stability during subsequent shipment, storage and use may be greatly increased. But it is generally preferable to add the chosen organic basic agent at a suitable stage in the alcohol manufacturing process so that losses during such operations may be reduced and greater purity of product may be obtained.

For the purpose of making our invention more clear it will be described with more particular reference to the manufacture of tertiary amyl alcohol from the corresponding tertiary amylenes by absorption in a mineral acid acting medium in accordance with the novel procedure described and claimed in the co-pending application of Van de Griendt and Engs, Serial No. 734,118, filed July 7, 1934 now Patent No. 2,060,143. But it will be understood that this implies no limitation on our invention which may be used to stabilize a wide variety of other aliphatic tertiary alcohols of five or more carbon atoms whether produced by the same or other, more conventional methods.

In accordance with the process of said application tertiary amyl alcohol is produced from the tertiary amylenes of, for example, a pentane amylene fraction obtainable by fractionation of cracked petroleum or the like. The tertiary amylenes are absorbed in an acid liquor produced by absorption of secondary amylenes in an aqueous sulfuric acid solution. Instead of such acid liquor, however, other mineral acid acting media such as fresh $H_2SO_4$ or $H_3PO_4$, etc. of suitable concentration may be used. The resulting tertiary amylene absorption product is diluted with water in the usual way and subjected to distillation or is treated in other known ways, such for example, as neutralization with caustic or the like, for the separation of the free acid content. The resulting crude alcohol mixtures usually have an acidity of less than 0.002% as $H_2SO_4$ before dehydration.

While it is not yet entirely clear why such products should be unstable, particularly during distillation, it has nevertheless been found that they gradually increase in acidity until at times acid values of 0.01% have been observed in the distillation kettle charge. It may be that this development of acidity is caused by decomposition of small amounts of sulfuric acid esters which liberate free acid which attacks the tertiary alcohol producing a drop in the still head temperature and the appearance of water in the distillate so that complete dehydration of the produce is practically impossible by distillation methods. However that may be, we have found that a small amount of an organic base prevents the development of acidity and renders the mixture absolutely stable. One drop of ethanolamine, for example, added to 500 cc. of crude alcohol (0.01 gallons per 1000) prevented detectable decomposition even when the mixture was subjected to 8 hours reflux or 18 hours at 200° C. in a pressure bomb. Accordingly we preferably add the organic base to the crude tertiary alcohol after removal of free acid therefrom, if any substantial amount is present, and before dehydration or other distillation treatment.

Inorganic bases are unsuitable for the stabilization of aliphatic tertiary alcohols not only because they are insoluble in the anhydrous crude mixtures, but also because they form insoluble salts, e. g. sulphates, which collect on the steam coils of the still and cause difficulties. Ammonia has the further disadvantage that it cannot be kept in the liquid state in contact with the crude material where it is needed. For the same reason highly volatile organic bases are less desirable than those of higher boiling point and in general basic agents which boil at or above the boiling point of the aliphatic tertiary alcohol are preferred. The presence of small amounts of organic base carried over during the distillation or added to the finished product are not objectionable but rather further improve and assure the stabilization of the tertiary alcohol produced.

While we have in the foregoing described in some detail the preferred embodiments of our invention, it will be understood that the invention is not to be regarded as limited to the details of operation described, nor is it dependent upon the accuracy of the theory advanced as to the advantageous results attained, but, on the contrary is to be considered as limited only by the terms of the accompanying claims in which it is our intention to claim all novelty inherent therein as broadly as is possible in view of the prior art.

We claim as our invention:

1. In a process of producing an aliphatic tertiary alcohol of at least five carbon atoms per molecule from the corresponding olefine by absorption in aqueous mineral acid solution, the step of distilling the substantially free acid free alcohol in the presence of not less than about 0.001% by volume of an organic nitrogen base.

2. In a process of producing tertiary amyl alcohol from a tertiary amylene containing hydrocarbon mixture by absorption of said olefine in aqueous sulfuric acid the step of distilling the substantially $H_2SO_4$ free alcohol in the presence of not less than 0.001% by volume of an ethanolamine.

3. A process of producing an aliphatic tertiary alcohol of at least five carbon atoms per molecule which comprises absorbing the corresponding olefine in an aqueous $H_2SO_4$ containing solution, separating unabsorbed olefine from the resulting absorption product, separating free acid from the absorption product, adding not less than about 0.001% by volume of an organic nitrogen base soluble in said alcohol to the resulting substantially free acid free product and distilling said product to recover said aliphatic tertiary alcohol therefrom.

4. In a distillation method for the purification of an aliphatic tertiary alcohol of at least five carbon atoms per molecule which is contaminated with a relatively small amount of an impurity capable of yielding a free mineral acid under the conditions of the distillation, the method of avoiding decomposition of the treated tertiary alcohol during distillation which comprises effecting the distillation in the presence of a stabilizing amount of an organic nitrogen base.

5. In a distillation method for the purification of a tertiary amyl alcohol which is contaminated with a relatively small amount of an alkyl ester of a strong mineral oxy-acid, the method of avoiding decomposition of the tertiary amyl alcohol during distillation which comprises effecting the distillation in the presence of a stabilizing amount of an organic nitrogen base.

6. A composition of matter stabilized against decomposition on distillation, which stable composition consists essentially of a substantially free acid free aliphatic tertiary alcohol of at least five carbon atoms prepared from the corresponding olefine by absorption in an aqueous mineral acid solution, and a stabilizing amount of an organic nitrogen base.

7. A composition of matter stabilized against decomposition on distillation, which stable composition consists essentially of a substantially free acid free tertiary amyl alcohol prepared by absorption of the corresponding olefine in an aqueous $H_2SO_4$-containing solution, and not less than 0.001% by volume of an organic nitrogen base.

8. A composition of matter stabilized against decomposition on distillation, which stable composition consists essentially of an aliphatic tertiary alcohol of at least five carbon atoms which is contaminated by a relatively small amount of an impurity which will yield a free mineral acid under distillation conditions, and a stabilizing amount of an organic nitrogen base.

WILLIAM ENGS.
ALASDAIR W. FAIRBAIRN.